United States Patent
Cross

[11] 3,987,443
[45] Oct. 19, 1976

[54] RADAR

[75] Inventor: Malcolm Geoffrey Cross, Colchester, England

[73] Assignee: The Marconi Company Limited, Chelmsford, England

[22] Filed: Oct. 21, 1975

[21] Appl. No.: 624,467

[30] Foreign Application Priority Data
May 14, 1975   United Kingdom............... 20244/75

[52] U.S. Cl. ........................... 343/5 SA; 324/77 C; 324/77 CS
[51] Int. Cl.² ...................... G01R 23/02; G01S 9/02
[58] Field of Search .................. 343/5 SA, 17.1 PF; 324/77 C, 77 CS

[56] References Cited
UNITED STATES PATENTS

| | | | |
|---|---|---|---|
| 3,614,719 | 10/1971 | Treacy........................... | 343/5 SA X |
| 3,729,738 | 4/1973 | Cross et al. ................... | 324/77 C X |
| 3,772,689 | 11/1973 | Root, Jr. ....................... | 343/5 SA X |
| 3,898,658 | 8/1975 | Jensen et al. ................. | 343/5 SA |

Primary Examiner—Malcolm F. Hubler
Attorney, Agent, or Firm—Baldwin, Wight & Brown

[57] ABSTRACT

A pulse Doppler radar utilizes a rapidly switched pulse repetition frequency, and is provided with a pulse integrator arranged to commutate at the prevailing pulse repetition frequency. By this means ambiguities in the Doppler frequency shift relating to range can be removed.

2 Claims, 7 Drawing Figures

RADAR

This invention relates to pulse doppler radar.

In such a radar, pulses of microwave energy are transmitted with a certain pulse repetition frequency (p.r.f.). When a pulse falls on a target it is reflected and an echo pulse is received at a time after transmission corresponding to the range (i.e. distance) of the target from the transmitting antenna. To analyse the received information a set of gates are opened sequentially, each for a short period of time, after transmission of each pulse, each gate being arranged to pass the signals received from a predetermined range to a separate channel. Within each channel there is included means for analysing the spectrum of the received signal such as to determine the frequency of the received pulse. The shift in frequency between the transmitted pulse and the received pulse due to the Doppler effect is indicative of the velocity of any target falling within that predetermined range.

When the p.r.f. of a pulse Doppler radar is fixed, it is inherent that there should be a degree of ambiguity if the p.r.f. is such that transmitted pulses follow one another in a shorter interval than it takes for a response to be received from the furthermost target within the overall range of the radar. This ambiguity is caused by the fact that a received signal need not necessarily be caused by a reflection of the immediately preceding transmitted pulse but could be a reflection from a more distant target of an earlier transmitted pulse. Thus, any received signal may correspond to a set of possible ranges for the target, the separation of the individual ranges being determined by the p.r.f. and the total number of ambiguities being a factor influenced both by the p.r.f. and the overall range of the radar.

A fixed p.r.f. may not only result in range ambiguities but also in velocity ambiguities. To appreciate this it is necessary to consider the frequency content of the transmitted signal. Because the transmissions are in the form of bursts of a fixed carrier frequency, the carrier frequency is not the only frequency present but there are also present all frequencies resulting from modulation of the carrier frequency by the p.r.f. The frequency spectrum of such a transmission is a line spectrum centred on the carrier frequency $f_c$ and having a plurality of further frequencies each differing from the centre frequency by a multiple (including one) of the p.r.f. The amplitudes of the frequency components decrease gradually with increasing separation from the centre frequency. Spectrum analysis of reflections from a stationary target will yield this same line spectrum whereas reflections from a moving target will displace the transmitted spectrum by an amount proportional to the target velocity. In the presence of noise one cannot be sure that in the received signal the component of greatest amplitude is the centre frequency and it is therefore possible to have a plurality of possible velocities each yielding effectively the same spectrum upon analysis.

In order to remove ambiguities in range and velocity it has already been proposed to change the pulse repetition frequency of the radar in between scans. That is to say, it has been suggested that one may carry out a complete scan of the area of surveillance with one p.r.f. and then carry out a second scan with a second p.r.f. The second p.r.f. will also have its own range ambiguities but provided that the two p.r.f.'s are not harmonically related one may remove ambiguities by cross-correlation. This is because if each p.r.f. yields a set of possible ranges for a target, there should only be one target range which occurs in both sets. Similarly velocity ambiguities may be sorted out by cross-correlation.

This proposal, however, gives rise to its own difficulties. A first difficulty is concerned with the fact that unambiguous information relating to any target can only be obtained after two complete scans. This may mean a delay of one or two seconds and such a delay is often unacceptable, for example where the target being detected is a missile approaching at high speed. A second difficulty arises in signal processing since all the information derived during a scan, i.e. information relating to all targets within an area of surveillance, must be stored for a period of one scan so that it may be correlated with the information derived from the subsequent scan. Even if such storage does not in itself give rise to very severe problems, there is still difficulty in correlating the information derived during a scan with the information stored in respect of a preceding scan since any target of interest is likely already to have changed its position and possibly even its speed. In the case of a rapidly moving target, it may mean that during one scan the target gives rise to a reflection passed by a first range gate and in the next scan by a different range gate. Thus, any system attempting to correlate information from one scan to the next is inherently involved, complex and consequently expensive and more susceptible to failure.

To resolve ambiguities without the need for storage and correlation between scans, it is necessary to change the p.r.f. of the radar sufficiently rapidly that during a single scan any target gives rise to reflections with two p.r.f.'s. Thus the p.r.f. should be changed during the time that the beam takes to traverse any point in space.

Previously, fast changes in p.r.f. have been considered as undesirable as they may give rise to an unacceptable level of spectrum spreading. Such spectrum spreading was thought to cause difficulties in the removal of clutter and also in spectrum analysis to determine target velocity. Furthermore, in order to optimize the signal to noise ratio it is necessary to integrate the responses over the full time that the beam crosses the target which involves integrating signals of two differing p.r.f.'s with unknown transitions from one p.r.f. to the next.

A clutter filter capable of mitigating the problems caused by spectrum spreading is described in our British Pat. Application No. 20242/75 filed on the same day as the present application. The clutter filter described enables interference from clutter to be suppressed and produces for any moving target of interest a CW signal having a frequency dependent upon Doppler shift. The frequency is centred on the I.F. of the radar and differs from the I.F. by less than the p.r.f.

A suitable spectrum analyser for determining the frequency content of the signals which occur at the output of the clutter filter is described in FIG. 1 of the accompanying drawings. Such a spectrum analyser is known in general terms, from our British Pat. Specification No. 1,299,023. The spectrum analyser includes a bandpass filter 10 connected to receive pulses of known repetition frequency which changes when the p.r.f. changes. The output of the filter 10 is applied to a dispersive delay line 12. Bandpass filter 10 is arranged to reduce the bandwidth of the input pulses to match the bandwidth of the dispersive delay line 12, these two units together constituting a passive network for generating a frequency swept signal.

These frequency swept signals are applied to one input of a mixer 14 which is also connected to receiver Doppler shifted signals occurring at i.f. frequency. The lower sideband of the mixing products is selected by a wide bandpass filter 16 which produces a frequency swept signal of known centre frequency whose timing is representative of the Doppler shift in the input signal. This frequency swept pulse is compressed in a dispersive delay line 18 whose output signal is passed to a detector and low-pass filter 20 to produce for each Doppler shifted input signal a pulse whose time delay in relation to the pulses applied to the bandpass filter 10 is representative of the Doppler shift.

The bandwidth of the Doppler spectrum is dependent upon the p.r.f. of the radar. It is preferable to so choose the p.r.f. of the pulses applied to the bandpass filter 10 that the sweeps are contiguous. When two p.r.f.'s of say 8 KC/s and 6.6 KC/s are used alternately, then in one case after a sweep of 8 KC/s is finished the next sweep begins and in the other case after a sweep of 6.6 KC/s is finished the next sweep begins. This is to enable maximum use to be made of available processing time; the passive generation of frequency sweeps enabling phase continuity to be preserved.

In order to detect the signals under conditions of noise and also to measure the Doppler frequency shift, it is necessary, as earlier mentioned, to integrate the pulses from any target over the full time that it is exposed to the radar beam.

At this juncture it is to be pointed out that the Doppler frequency shifted signals applied to the mixer 14 of the spectrum analyser contain ambiguous information and that ambiguities have to be resolved if correct measurements of Doppler shift are to be effected. In the example given above a true Doppler shift of, 2 KC/s would appear as a 2 KC/s shift in both p.r.f.'s. A 10 KC/s doppler shift will also give a 2 KC/s shift at the higher p.r.f. but will give a shift of 3.4 KC/s at the lower p.r.f., these figures being (10–8) KC/s and (10–6.6) KC/s respectively. Similarly, a 2 KC/s shift can be obtained with the higher p.r.f. if the true Doppler frequency shift is 18 KC/s etc. It is therefore necessary to correlate the frequency shifts measured in respect of each target appearing at both p.r.f.'s and to compare these to enable ambiguities to be resolved.

The present invention seeks to provide a radar in which the problems associated with integration and ambiguity resolution are mitigated.

According to the present invention, there is provided a pulse Doppler radar utilising rapidly switched p.r.f.'s, having a spectrum analyser adapted to mix a Doppler shifted frequency derived from a target return with frequency swept signals derived by application of a train of first pulses to a dispersive delay line, the first pulses being spaced apart by time intervals proportional to the prevailing p.r.f., the spectrum analyser further including means for processing the mixing products to produce a train of second pulses of the same frequency as the first pulses and whose timing in relation to the first pulses is representative of the Doppler shift, the radar further including integration means for integrating the train of second pulses, which integration means comprises a plurality of integrators sequentially connectible by a commutator means to receive the output signals of the spectrum analyser, each integrator being connected to integrate spectrum analyser output pulses corresponding to a predetermined range of Doppler shifted frequencies, and means for changing the commutation of the integrators in synchronism with changes in the p.r.f. of the radar such that each integrator is arranged to receive the signals at all p.r.f.'s corresponding a predetermined unambiguous range of Doppler shifted frequencies.

Preferably, each integrator is constituted by a first capacitor connected in a negative feedback loop of an amplifier and a second capacitor connected between an input of the amplifier and a line at reference potential, the commutator means being operative to connect different capacitors across the latter amplifier at different times following the said first pulses.

FIG. 1 shows a spectrum analyser for determining the frequency content of signals.

The invention will now be described further, by way of example, with reference to FIGS. 2, 3 and 4 of the accompanying drawings, in which.

Figure 1:
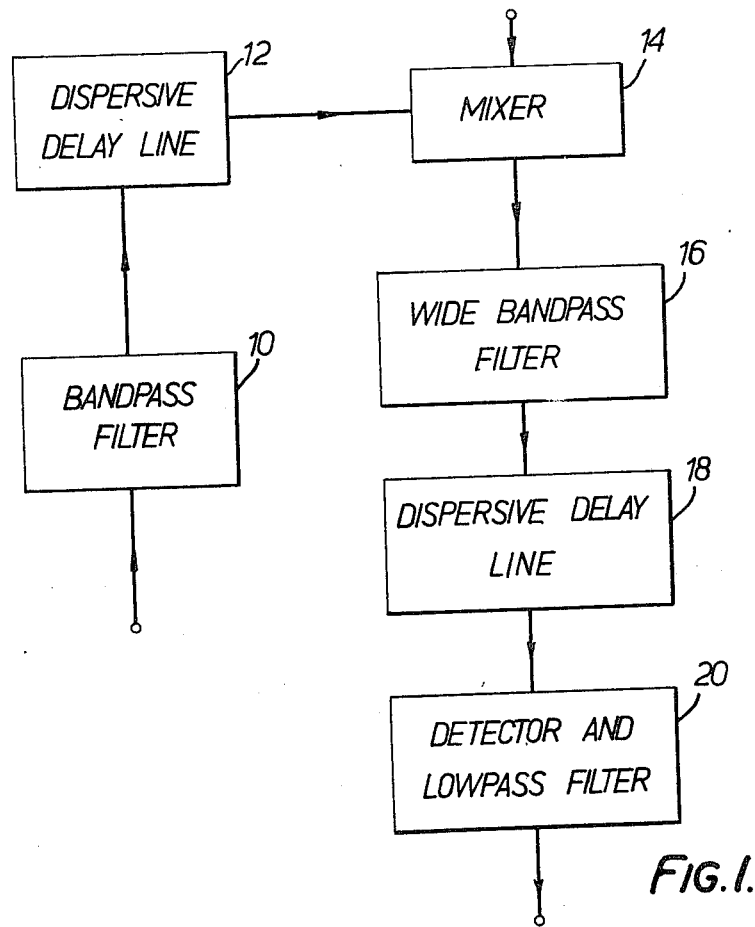
Figure 2:
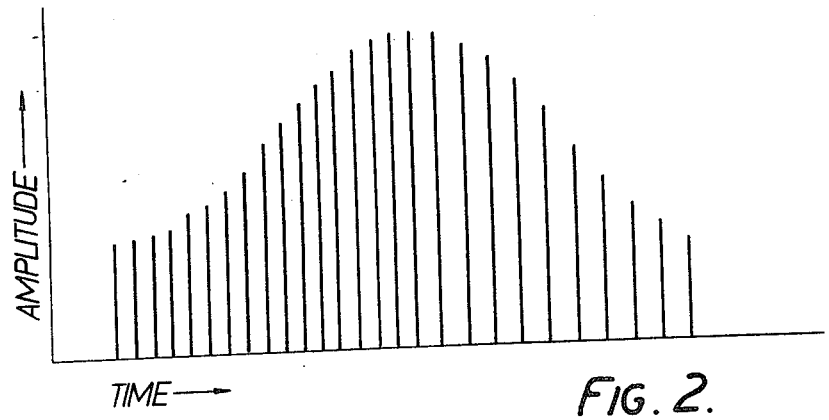
FIG. 2 shows the form of the output pulses of the spectrum analyser.

Referring first to FIG. 2, the output of the spectrum analyser is seen to comprise a series of pulses following a generally Gaussian shaped envelope. Within the envelope, the pulses adopt one of two repetition frequencies equal to the repetition frequencies of the signals applied to the bandpass filter 10 of the spectrum analyser described with reference to FIG. 1. The timing of the pulses under the Gaussian envelope in relation to the timing of the pulses applied to the bandpass filter is a function of the Doppler shift though the information contained in any one repetition frequency alone is ambiguous.

FIG. 4a shows the timing relationship of the output pulses of the spectrum analyser in greater detail. The vertical lines 40 indicate the timing of pulses applied to the bandpass filter 10 to generate a frequency sweep extending over a bandwidth of 8 KC/s and the vertical lines 42 indicate the timing of pulses generating frequency sweeps of bandwidth 6.6 KC/s. Assuming that there is present a true Doppler shift of 2 KC/s. This will generate the spikes 44 each of which follows the preceding pulse 40 or 42 by a time period equal to the time taken for the dispersive delay line 12 to sweep through 2 KC/s. The filter described in FIG. 3 seeks to integrate all the spikes 44 which, as may be seen, are not equally spaced in time.

Figure 3:
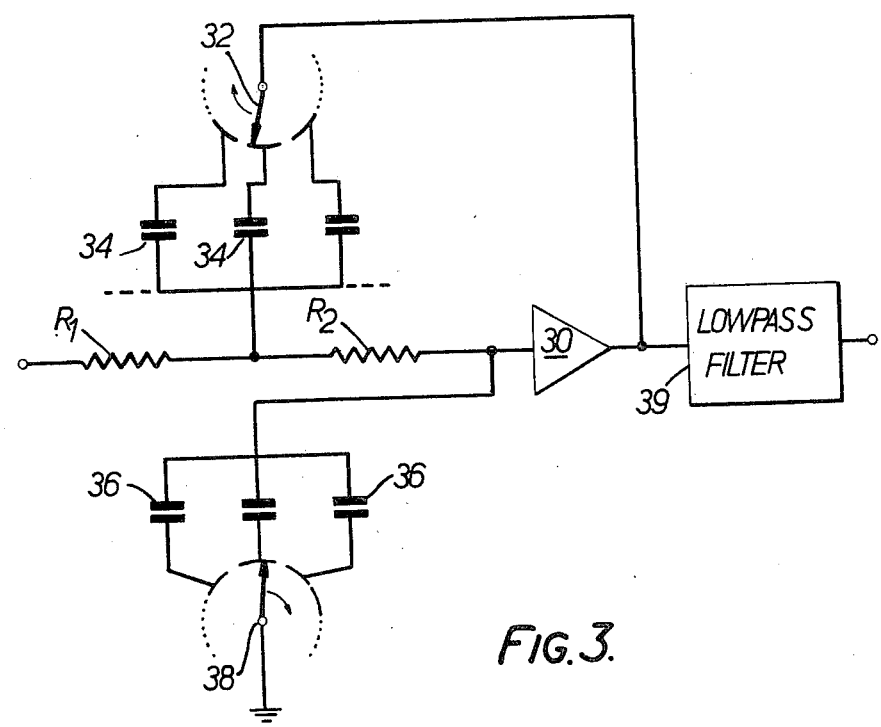
FIG. 3 shows a commutated capacitor integrating filter.
Figure 4:
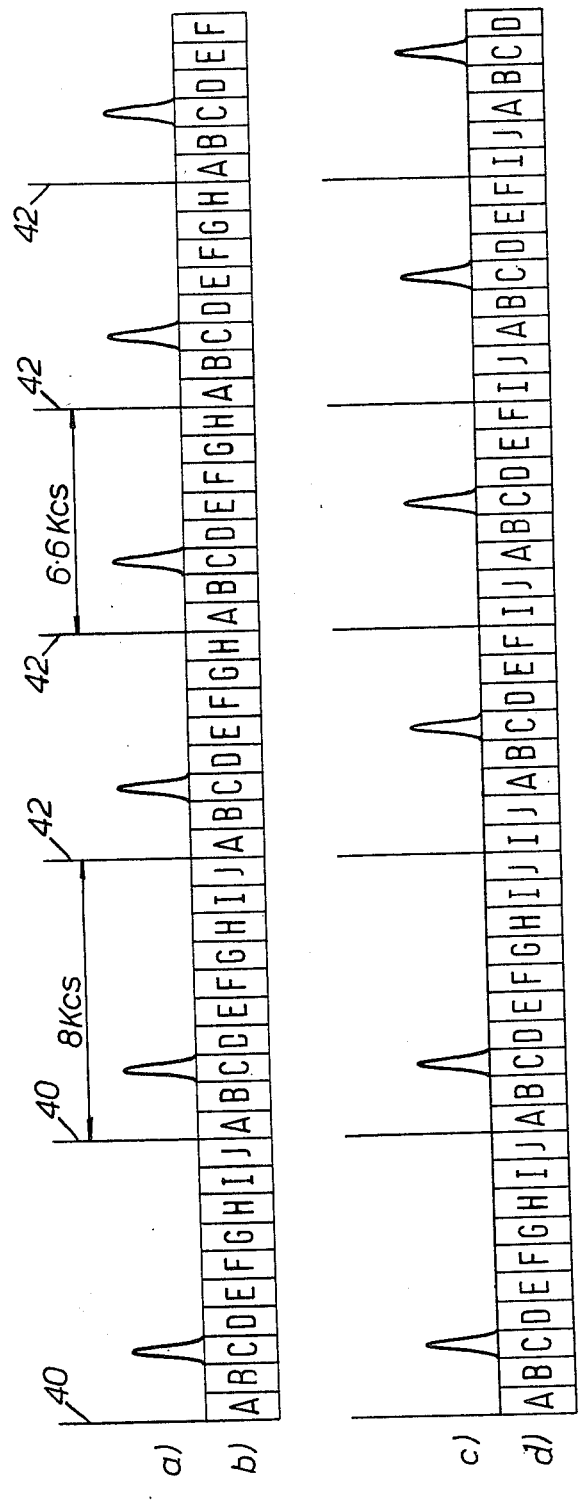
FIGS. 4a–4d are timing diagrams used to explain the method of operation of the integrating filter.

The commutated capacitor integrating filter in FIG. 3 includes a series of two resistors R1 and R2 connected to the input of an amplifier 30 whose output is connected by way of a commutator 32 and one of a bank of capacitors 34 to the junction between the resistors R1 and R2. The input of the amplifier 30 is further connected to a second bank of capacitors 36 which are sequentially connected to earth by means of a commutator 38 which is ganged to the commutator 32. The output from the amplifier 30 is smoothed by means of a low pass filter 39.

Assuming that the commutators 32 and 38 are stationary and that a predetermined one of the capacitors in each bank 34 and 36 is connected in the circuit. This constitutes a conventional integrating circuit in that the charge stored by the capacitor in the bank 34 is proportional to the time integral of the applied input pulses, the integration period being determined by the decay rate set by the capacitor in the bank 36.

The commutators are arranged to operate at such a rate that they carry out a complete cycle in the interval between consecutive pulses. Consequently, each capacitor is connected to receive the signals from a narrow Doppler frequency range. This may be seen from FIG. 4b which shows the sequence of connection of the capacitors in a bank of 10 which are designated by the letter of the alphabet A to J. Considering now only the sequence of events when a bandwidth of 8 KC/s is swept within the spectrum analyser, each of the capacitors A to J is connected sequentially in circuit and is therefore operative to receive the signals covering a bandwidth of 0.8 KC/s. Capacitor A is always connected to receive the first 0.8 KC/s of the sweep and capacitor J the last 0.8 KC/s. Thus in the drawing which demonstrates a Doppler shift centred on 2 KC/s, this will always be applied to the capacitor designated C.

When the p.r.f. of the radar is changed, then so is the frequency of the pulses applied to the spectrum analyser and likewise the commutation. The commutator continues to dwell for the same length of time on each capacitor but on this occasion the capacitors I and J are omitted on each cycle, thus shortening the length of the commutation cycle to match the frequency bandwidth which is swept by the spectrum analyser. It will be seen, therefore, that with the 2 KC Doppler shift this will continue to give rise to pulses which are integrated by the capacitor C.

Within the range of Doppler frequencies extending from 0 to 6.6 KC/s, the received signals will give rise at both p.r.f.'s to an increase in the peak charge stored across a predetermined one of the capacitors designated A to H. This is true for the zero order ambiguity. If the true Doppler frequency, however, lies in a range between 6.6 and 13 KC/s then this statement will not hold true but instead one capacitor will integrate pulses arising during one p.r.f. and another capacitor the pulses occurring at the other p.r.f. Such an example is given in FIG. 4c of the drawings. In this example, the true Doppler frequency is taken to be 10 KC/s. Because of the modulation of the carrier frequency by the p.r.f. in the manner earlier described, the Doppler frequency will have harmonics spaced apart by the prevailing p.r.f. which, in the case of the first p.r.f. will be 8 KC/s and in the case of the second p.r.f. 6.6 KC/s. Consequently, at the first p.r.f. the Doppler shift will give rise to a component occurring at 2 KC/s, as occurred in the example of FIG. 4a, but on this occasion the component detected by the frequency analyser during the second p.r.f. will occur at 3.4 KC/s.

In order to detect frequency shifts lying within this range, a second commutated capacitor filter identical in construction to that shown in FIG. 3 is provided whose commutation however is modified in the manner shown in FIG. 4d. During the first p.r.f. all the capacitors continue to be connected tn sequence in the same manner as has been described in connection with the zero ambiguity filter. Likewise, at the second p.r.f., the time that the commutator dwells on each capacitor remains the same and two capacitors are omitted in order to shorten the total cycle time. However, on this occasson, it is not the capacitors I and J that are omitted but the capacitors G and H though otherwise the cyclic sequence of commutation is maintained. It will be seen from correlation of FIGS. 4c and 4d that the 10 KC/s Doppler shift will give rise always to maximum charge across the capacitors C. At the same time, the zero order ambiguity filter will develop some charge across its capacitor C but also some charge across its capacitor E and therefore whilst the capacitor C and E in the zero ambiguity will have a charge the first ambiguity filter will develop twice that charge across the capacitor C. By a comparison of the levels it is possible to decide the level of ambiguity and thereby arrive at an accurate measurement of Doppler shift.

In a corresponding manner, if targets in the Doppler range 13 to 20 KC/s are of interst, it is possible to provide a second order ambiguity filter again identical with the zero and first order ambiguity filters but in which two other capacitors are omitted during the lower p.r.f. and whose order of commutation is designed such that in the presence of a second order ambiguity the charge will always develop across the same capacitor. It follows that there is a need for as many commutated capacitor integrators as there are possible ambiguities.

It will be appreciated that the integration technique provided in the present application may also serve to resolve range ambiguities in a totally analogous manner. In the case of range, the target returns are ambiguous on account of the fact that any given echo may have been caused by more than one transmitted radio frequency pulse. Hence, one has a set of reference times corresponding to the times of transmission and a set of echo pulses whose timing represents the range of the target with a possibility of ambiguity in an analogous manner to that described with reference to FIG. 4. It is believed that the manner in which a commutated capacitor filter may be used to overcome the problems of integration in the range channels will be self-evident to a person skilled in the art in view of the foregoing description.

I claim:

1. A pulse Doppler radar utilising rapidly switched p.r.f.'s, having a spectrum analyser adapted to mix a Doppler shifted frequency derived from a target return with frequency swept signals derived by application of a train of first pulses to a dispersive delay line, the first pulses being spaced apart by time intervals proportional to the prevailing p.r.f., the spectrum analyser further including means for processing the mixing products to produce a train of second pulses of the same frequency as the first pulses and whose timing in relation to the first pulses is representative of the Doppler shift, the radar further including integration means for integrating the train of second pulses, which integration means comprises a plurality of integrators sequentially connectible by a commutator means to receive the output signals of the spectrum analyser, each integrator being connected to integrate spectrum analyser output pulses corresponding to a predetermined range of Doppler shifted frequencies, and means for changing the commutation of the integrator in synchronism with changes in the p.r.f. of the radar such that each integrator is arranged to receive the signals at all p.r.f.'s corresponding a predetermined unambiguous range of Doppler shifted frequencies.

2. A pulse Doppler radar as claimed in claim 1 and wherein each integrator is constituted by a first capacitor connected in a negative feedback loop of an amplifier and a second capacitor connected between an input of the amplifier and a line at reference potential, the commutator means being operative to connect different capacitors across the latter amplifier at different times following the said first pulses.

* * * * *